UNITED STATES PATENT OFFICE.

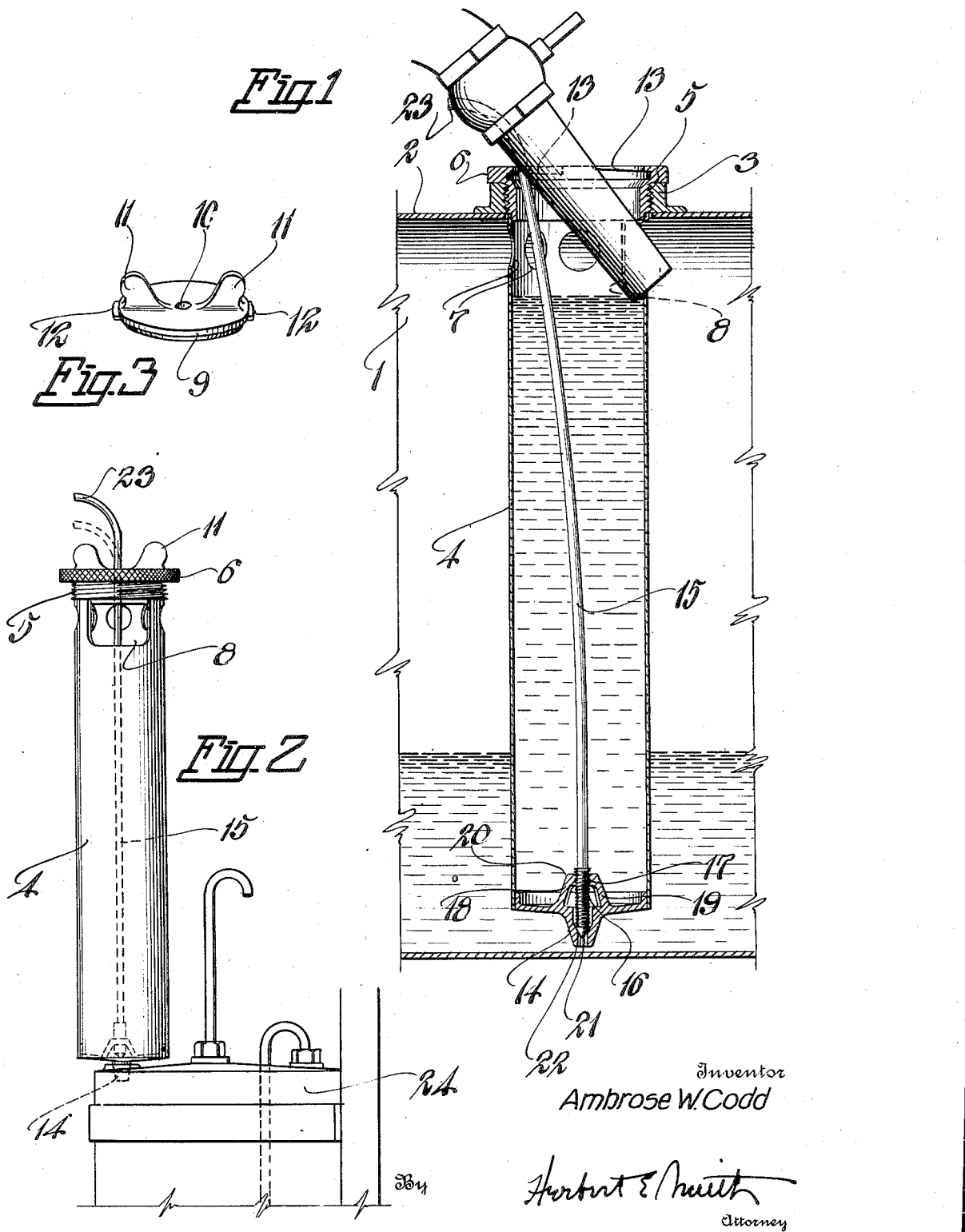

AMBROSE W. CODD, OF SPOKANE, WASHINGTON.

DETACHABLE RESERVE-SUPPLY TANK.

1,400,727. Specification of Letters Patent. Patented Dec. 20, 1921.

Application filed April 12, 1920, Serial No. 373,316. Renewed September 1, 1921. Serial No. 497,674.

*To all whom it may concern:*

Be it known that I, AMBROSE W. CODD, a citizen of the United States, residing at Spokane, in Spokane county and State of Washington, have invented certain new and useful Improvements in Detachable Reserve-Supply Tanks, of which the following is a specification.

The present invention relates to an improved detachable reserve supply tank for use in connection with the liquid fuel or gasolene supply of automobiles, motor trucks, etc., to be used in an emergency when the main supply has been exhausted from the main tank.

The invention contemplates a tank, preferably of cylindrical form, which is supported in and bodily removable from the main supply tank, for use when required in emptying the contents of the reserve tank into the vacuum tank included in the vacuum supply system of the automobile or other vehicle. The reserve supply tank may also be emptied into the main tank, in which it is normally located, and is so disposed in the main tank that, when filling the tanks, the reserve tank and the main tank are filled together by gasolene from the supply nozzle through ports provided therefor, but if the reserve tank fills first the surplus will overflow in the reserve tank.

Thus, when the main supply is consumed or exhausted from the main tank the reserve supply of fuel may be emptied into the main tank, or in case of an emergency it is frequently necessary to prime the vacuum fuel tank, and this is accomplished with facility because the combination and arrangement of the reserve and main tanks permits the bodily detachment and removal of the reserve tank from the main tank in order that the former may be used as a filler for the vacuum supply tank.

In order to accomplish the above purposes the invention consists in certain novel combinations and arrangements of parts as set forth in the accompanying drawings wherein one complete example of the physical embodiment of my invention is illustrated according to the best mode I have thus far devised for the practical application of the principles of my invention.

Figure 1 is a sectional view of a main fuel supply tank for an automobile, showing also the reserve supply tank of my invention supported therein in normal position.

Fig. 2 is a view showing the reserve supply tank detached and removed from the main tank and being utilized to replenish, by priming, the vacuum tank of the fuel supply system of an automobile.

Fig. 3 is a perspective view of the cap closing the inlet into the reserve tank and closing access into the main tank as well.

In equipping the main tank 1 with the reserve supply tank of my invention I make use of the usual filling opening in the top wall 2 such opening being indicated by the threaded boss 3 in which the reserve tank 4 is threaded by means of the bushing nut 5 formed at the upper open end of the tank 4 and provided with exterior screw threads as shown in Fig. 1. An overhanging flange 6 with knurled edges will provide means for applying the reserve tank to the main tank and tightly adjusting it thereto and with equal facility will provide means whereby the reserve tank may be bodily removed from the main tank for the purpose to be described.

Near the upper end of the reserve tank which is shown in the form of metallic cylinder, are provided a series of ports 7 or overflow openings extending around the cylinder and providing for passage of gasolene from the reserve tank to the main tank, or to allow air to escape during filling of the main tank. A filling port 8 somewhat larger than the overflow ports 7 is provided and takes the place of one or more of these overflow ports and is so located that it is possible when inserting the filler hose nozzle to overlap the port in the manner shown in Fig. 1 so that the greater percentage of gasolene passing through the hose will be turned directly into the main tank. This will insure a sufficient quantity to fill the reserve tank but allow the greater supply to enter the main tank to prevent overflowing and bubbling at such a rate that some of the fuel would be splashed or lost during the operation of filling.

By the above construction it is possible to rapidly fill the tank and to gain time which would otherwise be lost if the nozzle were inserted directly into the supply tank and had to entirely overflow through the ports. The reserve supply is closed by the filler cap 9 which is perforated centrally thereof at 10 to pass over the valve stem which will later be described. This cap is provided with wings 11 affording handhold to adjust the cap and with outstanding lugs 12 engaging in bayonet slots 13 to afford a quick and substantial fastening.

The reserve tank is supported in upright or vertical position in the main tank and extends from the top of the main tank to near the bottom, being of the length however, to permit the use of a nipple 14 which projects downwardly from the bottom of the resrve tank and is located centrally thereof or concentrically to the axis of the cylindrical tank. The bore of the nipple extends through the bottom of the tank and is adapted to receive a comparatively long valve stem 15 having its upper end supported through the perforation 10 in the cap. The lower end of this valve stem is threaded at 16 to engage complementary interior threads 17 in the perforated guide 18 secured or raised from the bottom of the tank. This guide 18 is formed of upstanding legs 19 with the interiorly threaded collar 20 to engage with the threaded stem 15. The flow of fluid is free to pass around the valve stem and down into the nipple but will be held against passage from the nipple by the conical valve end 21 engaging against the valve seat 22. Thus when the valve stem is screwed down and the end of same engages against the seat of the valve an exit of gasolene may be prevented.

At the upper end 23 the valve stem is curved on an arc and projects slightly above the filler cap when same is in place. As the stem 15 passes through the aperture 10 in the filler cap the valve stem will be maintained in a central position and guided at its upper end. The curved end 23 is then adaptable for opening or closing the valve as sufficient leverage is provided by reason of this curve. At the same time it is possible to remove the filler cap by disconnecting from the bayonet fastening means above described and sliding it past the end of the valve stem. The valve stem itself is of a flexible or semi-flexible material that will allow it to be positioned on one side of the opening so that the nozzle of the filler hose will have ready access to enter to resupply the tank with fresh fuel.

It will now be apparent that by turning the valve engaging the nipple to open position when the main tank is emptied the reserve supply may readily flow into this main tank. If the vacuum tank 24, Fig. 2, is to be filled the reserve tank is bodily removed from the main tank by unscrewing therefrom, then withdrawing the cylinder from the tank and the nozzle or nipple is then inserted in the filling opening in the vacuum tank as indicated in Fig. 2, and the valve opened by manipulating the stem as described.

I claim:—

The combination with a main supply tank having a threaded opening, of a bodily removable reserve supply tank supported therein and having overflow ports and a somewhat enlarged filler port near its upper end, a cap closing the upper end of the reserve tank, a downwardly projecting nipple on the lower end of the reserve supply tank, and a valve seat in said nipple, a stem within the reserve tank having a screw threaded end adjacent to said nipple and said stem formed with a valve head to close the valve seat in the nipple, the upper end of said stem curved to provide handhold for manipulation of same and provide means whereby the cap may be readily removed from said stem.

In testimony whereof I affix my signature.

AMBROSE W. CODD.